United States Patent
Prokhorov

(10) Patent No.: US 9,690,290 B2
(45) Date of Patent: Jun. 27, 2017

(54) SITUATION-BASED TRANSFER OF VEHICLE SENSOR DATA DURING REMOTE OPERATION OF AUTONOMOUS VEHICLES

(71) Applicant: Toyota Motor Engineering & Manufacturing North America, Inc., Erlanger, KY (US)

(72) Inventor: Danil V. Prokhorov, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 14/731,254

(22) Filed: Jun. 4, 2015

(65) Prior Publication Data

US 2016/0358475 A1    Dec. 8, 2016

(51) Int. Cl.
*G05D 1/00*      (2006.01)
*G08G 1/16*      (2006.01)
*G08G 5/00*      (2006.01)
*B60W 40/08*     (2012.01)

(52) U.S. Cl.
CPC ......... *G05D 1/0022* (2013.01); *G05D 1/0011* (2013.01); *G05D 1/0088* (2013.01); *B60W 2040/0818* (2013.01); *G08G 1/165* (2013.01); *G08G 1/166* (2013.01); *G08G 5/0013* (2013.01); *G08G 5/0069* (2013.01); *G08G 5/0078* (2013.01); *G08G 5/0091* (2013.01)

(58) Field of Classification Search
CPC ...... G08G 1/16; G05D 1/0011; G05D 1/0022; G05D 1/0088
USPC .......................... 701/2, 23; 180/443; 700/245
See application file for complete search history.

(56) References Cited

U.S. PATENT DOCUMENTS

| | | | |
|---|---|---|---|
| 5,448,479 | A | 9/1995 | Kemner et al. |
| 7,894,951 | B2 * | 2/2011 | Norris ...................... H04L 67/12 180/443 |
| 8,160,811 | B2 | 4/2012 | Prokhorov |

(Continued)

OTHER PUBLICATIONS

Okumura et al.; "Remote Operation of Autonomous Vehicle in Unexpected Environment"; U.S. Appl. No. 14/541,061, filed Nov. 13, 2014.

(Continued)

*Primary Examiner* — Shardul Patel
(74) *Attorney, Agent, or Firm* — Christopher G. Darrow; Darrow Mustafa PC

(57) ABSTRACT

Arrangements relating to the transfer of data from an autonomous vehicle to a remote operation computing system while the autonomous vehicle is operating in a remote operational mode are described. A driving environment of the autonomous vehicle can be sensed using a sensor system to acquire driving environment data. The sensor system includes a plurality of different types of sensors. A driving environment complexity can be determined. The availability of a communication channel between the autonomous vehicle and the remote operation computing system can be determined. A subset of the plurality of different types of sensors can be selected based on the determined driving environment complexity and/or the determined communication channel availability and/or its quality. Driving environment data acquired by the selected subset of the plurality of different types of sensors can be sent to the remote operation computing system.

17 Claims, 4 Drawing Sheets

(56) References Cited

U.S. PATENT DOCUMENTS

| | | | |
|---|---|---|---|
| 8,954,194 B2* | 2/2015 | Allis | G05D 1/0038 |
| | | | 700/245 |
| 8,972,081 B2 | 3/2015 | Gersabeck et al. | |
| 2008/0033603 A1* | 2/2008 | Gensler | B62D 15/0285 |
| | | | 701/1 |
| 2015/0198951 A1* | 7/2015 | Thor | B60W 10/04 |
| | | | 701/23 |
| 2015/0248131 A1* | 9/2015 | Fairfield | G05D 1/0044 |
| | | | 701/2 |
| 2015/0348112 A1* | 12/2015 | Ramanujam | G01C 21/34 |
| | | | 705/14.63 |
| 2016/0139594 A1* | 5/2016 | Okumura | B60W 30/00 |
| | | | 701/2 |

OTHER PUBLICATIONS

Davies; "Ford's Working on a Remote Control for Your Car"; Jan. 26, 2015; [retrieved Jun. 2, 2015]; retrieved from the Internet: <http://www.wired.com/2015/01/fords-working-remote-control-car/> (9 pages).

* cited by examiner

SITUATION-BASED TRANSFER OF VEHICLE SENSOR DATA DURING REMOTE OPERATION OF AUTONOMOUS VEHICLES

FIELD

The subject matter described herein in general to vehicles that have an autonomous operational mode and, more particularly, to the remote operation of such vehicles.

BACKGROUND

Autonomous vehicles or highly automated vehicles can be configured to operate in a plurality of operational modes. An example of an operational mode is one in which a computing system is used to navigate and/or maneuver the vehicle along a travel route with minimal or no input from a human driver. Such vehicles are equipped with sensors that are configured to detect information about the surrounding environment, including the presence of objects in the environment. The detected information can be sent to the computing system. In some instances, such vehicles can be configured to allow them to be controlled by a remote operator.

SUMMARY

In one respect, the present disclosure is directed to a method of transferring data from an autonomous vehicle to a remote operation computing system while the autonomous vehicle is operating in a remote operational mode. The method includes sensing a driving environment of the autonomous vehicle using a sensor system to acquire driving environment data. The sensor system including plurality of different types of sensors. The method can also include selecting a subset of the plurality of different types of sensors based on at least one of a driving environment complexity and a communication channel availability between the autonomous vehicle and a remote operation computing system. The method can include sending driving environment data acquired by the selected subset of the plurality of different types of sensors to the remote operation computing system.

In another respect, the present disclosure is directed to a system for transferring data from an autonomous vehicle to a remote operation computing system while the autonomous vehicle is operating in a remote operational mode. The system includes a sensor system. The sensor system can include a plurality of different types of sensors. The sensor system can be configured to sense a driving environment of the autonomous vehicle to acquire driving environment data.

The system can also include a processor operatively connected to the plurality of different types of sensors. The processor can be programmed to initiate executable operations. The executable operations can include selecting a subset of the plurality of different types of sensors based on at least one of a driving environment complexity and a communication channel availability between the autonomous vehicle and a remote operation computing system. The executable operations can also include sending driving environment data acquired by the selected subset of the plurality of different types of sensors to the remote operation computing system.

In still another respect, the present disclosure is directed to a computer program product for transferring vehicle sensor data from an autonomous vehicle to a remote operation computing system while the autonomous vehicle is operating in a remote operational mode. The computer program product includes a computer readable storage medium having program code embodied therewith. The program code is executable by a processor to perform a method. The method includes sensing a driving environment of the autonomous vehicle using a sensor system to acquire driving environment data. The sensor system includes plurality of different types of sensors. The method also includes selecting a subset of the plurality of different types of sensors based on at least one of a driving environment complexity and a communication channel availability between the autonomous vehicle and a remote operation computing system. The method further includes sending driving environment data acquired by the selected subset of the plurality of different types of sensors to the remote operation computing system.

DETAILED DESCRIPTION

Figure 1:
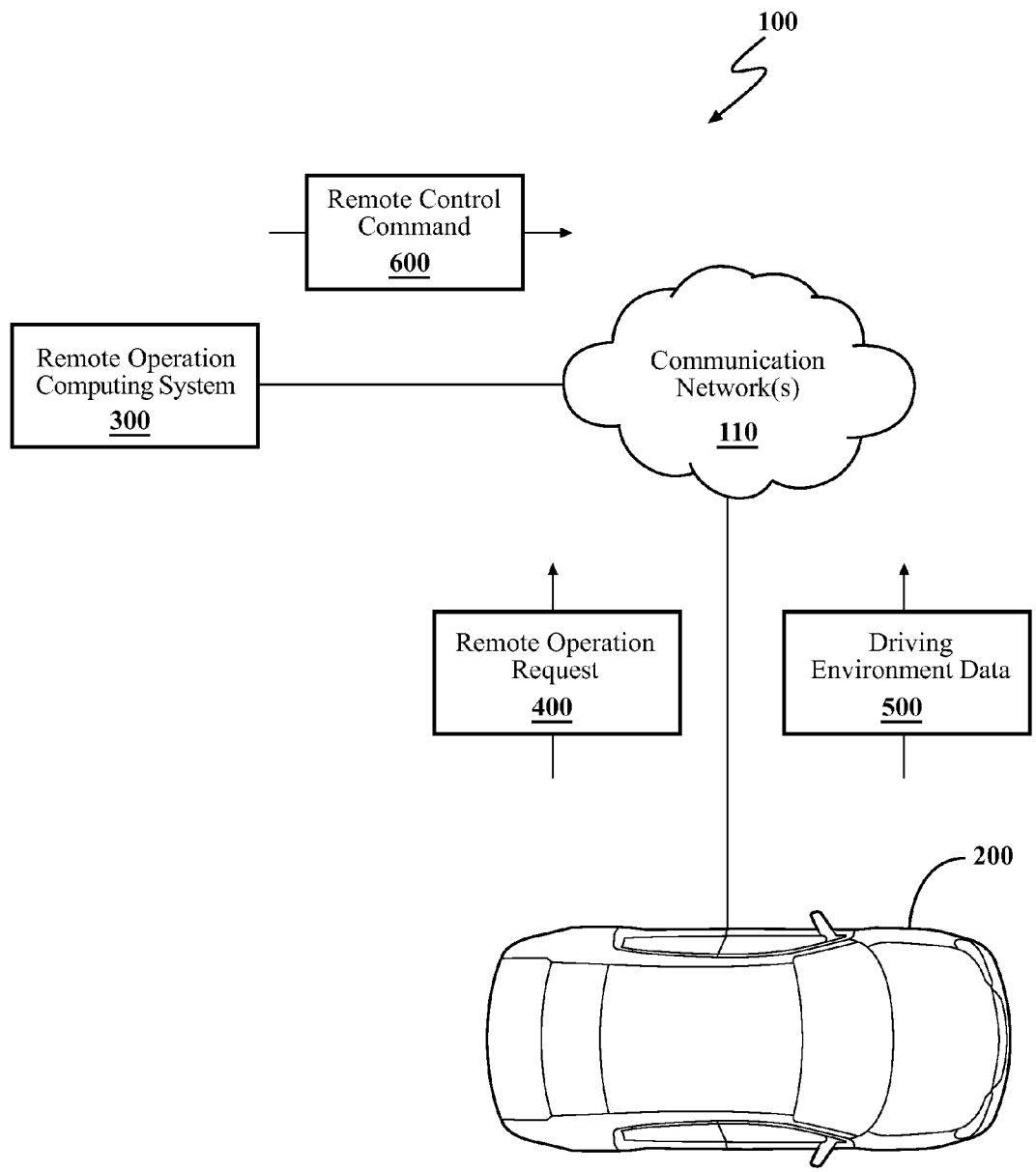
FIG. 1 is an example of a system for remote operation of an autonomous vehicle.

This detailed description relates to the transfer of driving environment data between an autonomous vehicle and a remote operation computing system, particularly when the vehicle is operating in a remote operational mode. A driving environment of the autonomous vehicle can be sensed using a plurality of different types of sensors to acquire driving environment data. A subset of the plurality of different types of sensors can be selected based on a driving environment complexity and/or a communication channel availability between the autonomous vehicle and the remote operation computing system. Driving environment data acquired by the selected subset of the plurality of different types of sensors can be sent to the remote operation computing system. The present detailed description relates to systems, methods and computer program products that incorporate one or more of such features. In at least some instances, such systems, methods and computer program products can facilitate efficient data transfer to a remote operator based on the current situation of the vehicle. Such data transfer can enable a remote operator to make timely and informed decisions with respect to the remote operation of the autonomous vehicle.

Detailed embodiments are disclosed herein; however, it is to be understood that the disclosed embodiments are intended only as exemplary. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-4, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

FIG. 1 is an example of a system 100 for remote operation of a vehicle. Some of the possible elements of the system 100 are shown in FIG. 1 and will now be described. It will be understood that it is not necessary for the system 100 to have all of the elements shown in FIG. 1 or described herein. The system 100 can include a vehicle 200 and a remote operation computing system 300.

The vehicle 200 and the remote operation computing system 300 can be communicatively linked through one or more communication networks 110. As used herein, the term "communicatively linked" can include direct or indirect connections through a communication channel or pathway or another component or system. A "communication network" means one or more components designed to transmit and/or receive information from one source to another.

The one or more communication networks 110 can be implemented as, or include, without limitation, a wide area network (WAN), a local area network (LAN), the Public Switched Telephone Network (PSTN), a wireless network, a mobile network, a Virtual Private Network (VPN), the Internet, and/or one or more intranets. The communication network 110 further can be implemented as or include one or more wireless networks, whether short or long range. For example, in terms of short range wireless networks, the communication network 110 can include a local wireless network built using a Bluetooth or one of the IEEE 802 wireless communication protocols, e.g., 802.11a/b/g/i, 802.15, 802.16, 802.20, Wi-Fi Protected Access (WPA), or WPA2. In terms of long range wireless networks, the communication network 700 can include a mobile, cellular, and or satellite-based wireless network and support voice, video, text, and/or any combination thereof. Examples of long range wireless networks can include GSM, TDMA, CDMA, WCDMA networks or the like. The communication network 110 can include wired communication links and/or wireless communication links. The communication network 110 can include any combination of the above networks and/or other types of networks. The communication network 110 can include one or more routers, switches, access points, wireless access points, and/or the like.

The vehicle 200 and the remote operation computing system 300 can include and/or can execute suitable communication software, which enables the vehicle 200 and the remote operation computing system 300 to communicate with each other through the communication network 110 and perform the functions disclosed herein. The vehicle 200 can be configured to send remote operation requests 400 and driving environment data 500 to the remote operation computing system 300. The remote operation computing system 300 can be configured to send remote control commands 600 to the vehicle 200.

Figure 2:
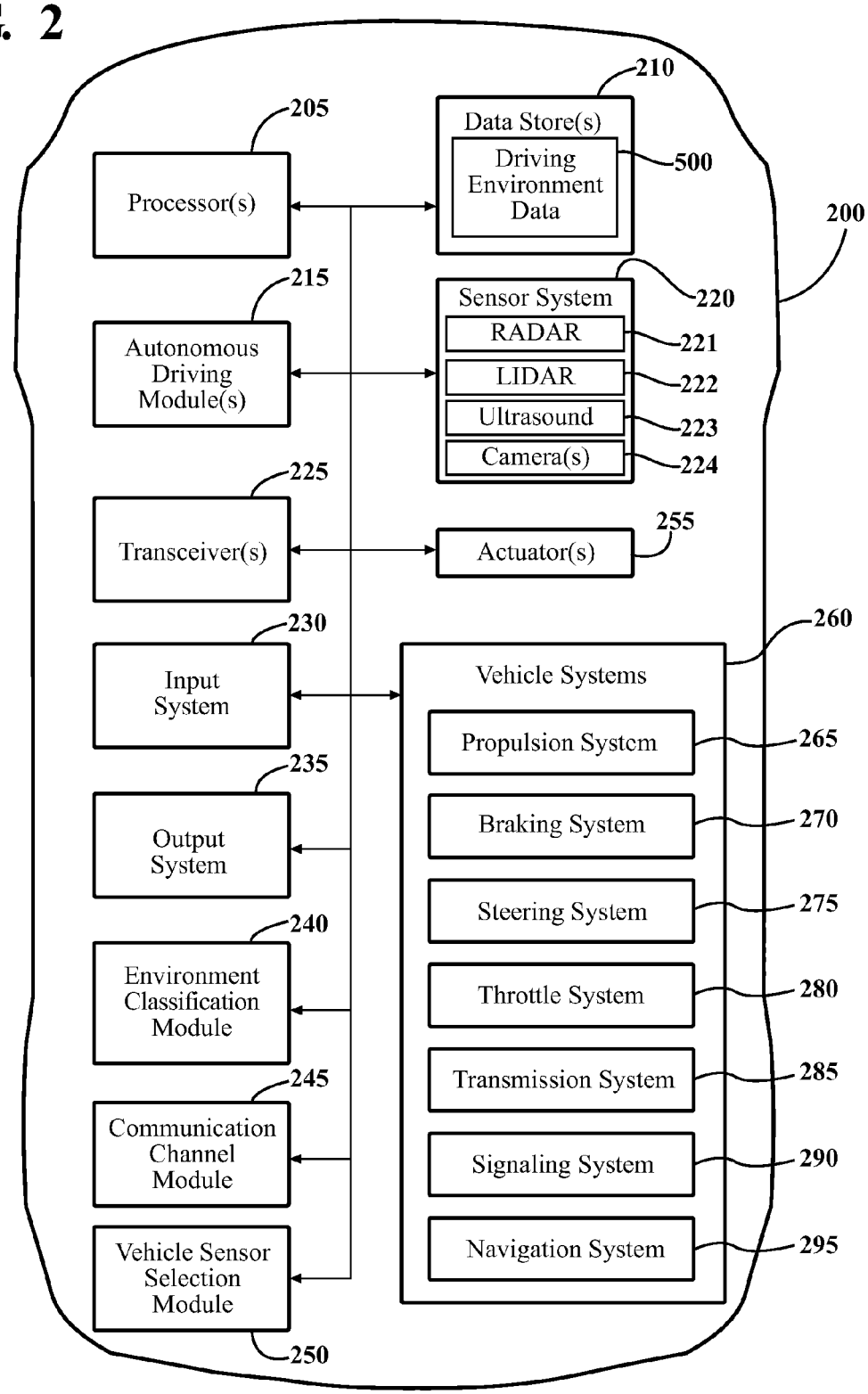
FIG. 2 is an example of an autonomous vehicle.

The vehicle 200 will now be described in greater detail. Referring to FIG. 2, an example of the vehicle 200 is shown. The vehicle 200 can be any suitable type of vehicle. As used herein, "vehicle" means any form of motorized transport. In one or more implementations, the vehicle 200 can be an automobile. While arrangements will be described herein with respect to automobiles, it will be understood that embodiments are not limited to automobiles. In one or more implementations, the vehicle 200 may be a watercraft, an aircraft or any other form of motorized transport.

According to arrangements herein, the vehicle 200 can be an autonomous vehicle. As used herein, "autonomous vehicle" means a vehicle that configured to operate in an autonomous mode. "Autonomous mode" means that one or more computing systems are used to navigate and/or maneuver the vehicle with minimal or no input from a human driver. In one or more arrangements, the vehicle 200 can be highly automated.

The vehicle 200 can have an unmonitored autonomous operational mode. "Unmonitored autonomous operational mode" means that one or more computing systems are used to navigate and/or maneuver the vehicle along a travel route with no input or supervision required from a human driver. The vehicle 200 can have a monitored autonomous operational mode. "Monitored autonomous operational mode" means that one or more computing systems are used to navigate and/or maneuver the vehicle with at least some human driver supervision required. The vehicle 200 can have one or more semi-autonomous operational modes. "Semi-autonomous operational mode" means that a portion of the navigation and/or maneuvering of the vehicle along a travel route is performed by one or more computing systems, and a portion of the navigation and/or maneuvering of the vehicle along a travel route is performed by a human driver. The vehicle 200 can have a manual operational mode. "Manual operational mode" means that a substantial majority or all of the navigation and/or maneuvering of the vehicle is performed by a human driver with minimal or no input from a computing system.

The vehicle 200 can be configured to be switched between the various operational modes. Such switching can be implemented in any suitable manner, now known or later developed. The switching can be performed automatically, or it can be done responsive to receiving a manual input or request.

The vehicle 200 can have a remote operational mode. "Remote operational mode" means that at least a portion of the navigation and/or maneuvering of the vehicle is monitored, supervised, and/or controlled by a remote operator. A "remote operator" is a person who is located external to the vehicle and who has the ability to affect one or more aspects of the operational of a vehicle. The remote operator can be physically separated from the vehicle 200 by any suitable distance, including by large distances.

The remote operational mode can be activated in any suitable manner. For instance, the vehicle 200 can send a remote operation request 400 to the remote operation computing system 300. The request can be selectively accepted by the remote operation computing system 300, the remote user, and/or some other entity or element. In one or more arrangements, the remote operation request 400 can be sent automatically by the vehicle 200 upon the occurrence of a predetermined event. For example, the vehicle 200 may automatically send the remote operation request 400 if an input is not received from a vehicle occupant (e.g., a driver) within a predetermined period of time, such as may occur when the vehicle occupant is distracted, sleeping, impaired, incapacitated, and/or otherwise unavailable. As another example, the vehicle 200 may automatically send the remote operation request 400 in certain driving environments (e.g., complex driving environments). As a further example, the vehicle 200 may automatically send the remote operation request 400 if sensor errors or discrepancies are detected.

Alternatively or in addition, the remote operation request 400 can be sent in response to a request by a vehicle occupant. For instance, a driver may request the remote operational mode if he or she becomes drowsy or excessively tired. As another example, a driver may request the remote operational mode if he or she is not be comfortable maneuvering the vehicle 200 in the current driving environment.

The vehicle 200 can include various elements. Some of the possible elements of the vehicle 200 are shown in FIG. 2 and will now be described. It will be understood that it is not necessary for the vehicle 200 to have all of the elements shown in FIG. 2 or described herein. The vehicle 200 can have any combination of the various elements shown in FIG. 2. Further, the vehicle 200 can have additional elements to those shown in FIG. 2. In some arrangements, vehicle 200 may not include one or more of the elements shown in FIG. 2. Further, while the various elements are shown as being located within the vehicle 200 in FIG. 2, it will be understood that one or more of these elements can be located external to the vehicle 200. Further, the elements shown may be physically separated by large distances.

The vehicle 200 can include one or more processors 205. "Processor" means any component or group of components that are configured to execute any of the processes described herein or any form of instructions to carry out such processes or cause such processes to be performed. The processor 205 may be implemented with one or more general-purpose and/or one or more special-purpose processors. Examples of suitable processors include microprocessors, microcontrollers, DSP processors, and other circuitry that can execute software. Further examples of suitable processors include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller. The processor 205 can include at least one hardware circuit (e.g., an integrated circuit) configured to carry out instructions contained in program code. In arrangements in which there is a plurality of processors 205, such processors can work independently from each other or one or more processors can work in combination with each other. In one or more arrangements, the processor 205 can be a main processor of the vehicle 200. For instance, the processor 205 can be an engine control unit (ECU).

The vehicle 200 can include one or more data stores 210 for storing one or more types of data. The data store 210 can include volatile and/or non-volatile memory. Examples of suitable data stores 210 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 210 can be a component of the processor 205, or the data store 210 can be operatively connected to the processor 205 for use thereby. The term "operatively connected," as used throughout this description, can include direct or indirect connections, including connections without direct physical contact.

The vehicle 200 can include one or more autonomous driving modules 215. The autonomous driving module 215 can be implemented as computer readable program code that, when executed by a processor, implement various processes described herein, including, for example, determining a travel route, directly or indirectly causing the determined travel route to be implemented, determining a driving maneuver, directly or indirectly causing the determined driving maneuver to be implemented, determining a modification to a current driving maneuver of the vehicle 200, and/or directly or indirectly causing a current driving maneuver of the vehicle 200 to be modified. The autonomous driving module 215 can be a component of the processor 205, or the autonomous driving module 215 can be executed on and/or distributed among other processing systems to which the processor 205 is operatively connected.

The autonomous driving module 215 can include instructions (e.g., program logic) executable by the processor 205. Such instructions can include instructions to execute various vehicle functions and/or to transmit data to, receive data from, interact with, and/or control the vehicle 200 or one or more systems thereof (e.g., one or more of vehicle systems 260). Alternatively or in addition, the data store 210 may contain such instructions.

As noted above, the vehicle 200 can include a sensor system 220. The sensor system 220 can include one or more sensors. "Sensor" means any device, component and/or system that can detect, determine, assess, monitor, measure, quantify and/or sense something. The one or more sensors can be configured to detect, determine, assess, monitor, measure, quantify and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 220 includes a plurality of sensors, the sensors can work independently from each other. Alternatively, two or more of the sensors can work in combination with each other. In such case, the two or more sensors can form a sensor network. The sensor system 220 and/or the one or more sensors can be operatively connected to the processor 205, the data store 210, the autonomous driving module 215 and/or other element of the vehicle 200.

The sensor system 220 can include any suitable type of sensor. For example, the sensor system 220 can include one or more sensors configured to detect, determine, assess, monitor, measure, quantify and/or sense information about the vehicle 200. Alternatively or in addition, the sensor system 220 can include one or more sensors configured to detect, determine, assess, monitor, measure, quantify and/or sense information about the external environment in which the vehicle 200 is located, including information about objects in the external environment. Such objects may be stationary or moving objects.

Alternatively or in addition to one or more of the above examples, the sensor system 220 can include one or more sensors configured to detect, determine, assess, monitor, measure, quantify and/or sense the location of the vehicle 200 and/or the location of objects in the environment, relative to the vehicle 200 and/or with respect to any suitable coordinate system. Various examples of these and other types of sensors will be described herein. It will be understood that the embodiments are not limited to the particular sensors described.

The sensor system 220 can include one or more sensors configured to detect, determine, assess, monitor, measure, quantify and/or sense position and orientation changes of the vehicle 200, such as, for example, based on inertial acceleration. In one or more arrangements, the sensor system 220 can include accelerometers, gyroscopes and/or other suitable sensors. The sensor system 220 can include sensors that can monitor one or more internal systems of the vehicle 200 (e.g., an $O_2$ monitor, a fuel gauge, an engine oil temperature, coolant temperature, etc.).

The sensor system 220 can include one or more driving environment sensors. The driving environment sensors can be configured to detect, determine, assess, monitor, measure, quantify and/or sense objects in at least a portion of the external environment of the vehicle 200 and/or information/data about such objects. The driving environment sensors can include a plurality of different types of sensors.

The driving environment sensors can be configured, positioned, distributed, and/or arranged to acquire data from any suitable portion of the driving environment. In one or more arrangements, the driving environment sensors can be configured, positioned, distributed, and/or arranged to acquire data from substantially 360 degrees about the vehicle 200. As used herein, the term "substantially" includes exactly the term it modifies and slight variations therefrom. Thus, the term "substantially 360 degrees" means exactly 360 degrees and slight variations therefrom. Further, one or more of the driving environment sensors can be configured to capture driving environment data from any suitable portion of the electromagnetic spectrum. Various examples of the environment sensors will be described herein. However, it will be understood that the embodiments are not limited to the particular sensors described.

In one or more arrangements, the sensor system 220 can include one or more RADAR sensors 221. The RADAR sensors 221 can use at least in part radio signals. Such sensors can include a radio source configured to emit radio signals and a detector configured to detect reflections of the radio signal. The one or more RADAR sensors can be configured and/or used to detect, determine, assess, monitor, measure, quantify and/or sense, directly or indirectly, various things about the driving environment of the vehicle 200. Non-limiting examples of such things include the presence of one or more objects in the driving environment of the vehicle 200, the position of each detected object relative to the vehicle 200 or otherwise, the distance between each detected object and the vehicle 200 in one or more directions, the speed of each detected object, and/or the movement of each detected object.

In one or more arrangements, the sensor system 220 can include LIDAR sensors 222. The LIDAR sensors 222 can use at least in part laser signals. The LIDAR sensors 222 can include a laser source and/or laser scanner configured to emit a laser and a detector configured to detect reflections of the laser. The LIDAR sensors 222 may be provided as a part of a LIDAR unit or a laser rangefinder. The LIDAR sensors 222 may be configured to operate in a coherent or an incoherent detection mode. The LIDAR sensors 222 can be configured and/or used to detect, determine, assess, monitor, measure, quantify and/or sense, directly or indirectly, various things about the driving environment of the vehicle 200. Non-limiting examples of such things include the presence of one or more objects in the external environment of the vehicle 200, the position of each detected object relative to the vehicle 200 or otherwise, the distance between each detected object and the vehicle 200 in one or more directions, the speed of each detected object, and/or the movement of each detected object.

In one or more arrangements, the sensor system 220 can include ultrasound sensors 223. The ultrasound sensors 223 can use at least in part ultrasonic signals. Such sensors can include an ultrasonic source configured to emit ultrasonic signals and a detector configured to detect reflections of the ultrasonic signal. The one or more ultrasound sensors 223 can be configured and/or used to detect, determine, assess, monitor, measure, quantify and/or sense, directly or indirectly, various things about the driving environment of the vehicle 200. Non-limiting examples of such things include the presence of one or more objects in the external environment of the vehicle 200, the position of each detected object relative to the vehicle 200 or otherwise, the distance between each detected object and the vehicle 200 in one or more directions, the speed of each detected object, and/or the movement of each detected object. Such detecting can be based on a characteristic (e.g., the intensity) of a reflected ultrasonic signal.

In one or more arrangements, the sensor system 220 can include one or more cameras 224. "Camera" is defined as any device, component, and/or system that can capture visual data. "Visual data" includes video and/or image information/data. The visual data can be in any suitable form. In one or more arrangements, one or more of the cameras 224 can include a lens (not shown) and an image capture element (not shown). The image capture element can be any suitable type of image capturing device or system, including, for example, an area array sensor, a Charge Coupled Device (CCD) sensor, a Complementary Metal Oxide Semiconductor (CMOS) sensor, or a linear array sensor. The image capture element may capture images in any suitable wavelength on the electromagnetic spectrum. The image capture element may capture color images and/or grayscale images. One or more of the cameras can be configured with zoom in and/or zoom out capabilities.

The one or more cameras 224 can be oriented, positioned, configured, operable, and/or arranged to capture visual data from at least a portion of the external environment of the vehicle 200. The one or more cameras 224 can be located in any suitable portion of the vehicle 200. For instance, one or more of the cameras 224 can be located within the vehicle 200. One or more of the cameras 224 can be located on the exterior of the vehicle 200. One or more of the cameras 224 can be located on or exposed to the exterior of the vehicle 200.

The position of one or more of the cameras 224 can be fixed such that its position does not change relative to the vehicle 200. One or more of the cameras 224 can be movable so that its position can change to allow visual data from different portions of the external environment of the vehicle 200 to be captured. The movement of such cameras 224 can be achieved in any suitable manner.

Alternatively or in addition to any of the sensors described above, the sensor system 220 can include other types of sensors. The sensor system 220, the processor 205, the autonomous driving module 215, and/or other element(s) of the vehicle 200 can be operable to control movements or other aspects of one or more of the sensors and/or cameras of the sensor system 220. It should be noted that any of the sensors and/or cameras described herein can be provided in any suitable location with respect to the vehicle 200. For instance, one or more sensors and/or one or more cameras can be located within the vehicle 200. Alternatively or in addition, one or more sensors and/or one or more cameras can be located on the exterior of the vehicle 200. Still alternatively or in addition, one or more sensors and/or one or more cameras can be located so as to be exposed to the exterior of the vehicle 200.

In some arrangements, the sensor system 220, the processor 205, the autonomous driving module 215, and/or other element(s) of the vehicle 200 can be configured to detect, determine, assess, monitor, measure, quantify and/or sense, directly or indirectly, one or more aspects, characteristics and/or properties of a detected object. For example, the sensor system 220, the processor 205, the autonomous driving module 215, and/or other element(s) of the vehicle 200 can be configured to detect, determine, assess, monitor, measure, quantify and/or sense, directly or indirectly, the size, relative size, length, width, height, a dimension, the material, a material property, the speed, the acceleration and/or a current or predicted trajectory of a detected object. In one or more arrangements, one or more artificial or computational algorithms or machine learning methods can be used for such purposes.

The sensor system 220 can be configured to capture location information for objects within the environment surrounding the vehicle 200 for use by the processor 205, the autonomous driving module 215, and/or other element(s) to estimate position and orientation of the vehicle 200, images for processing by an image sensor, vehicle position in global coordinates based on signals from a plurality of satellites, or any other data and/or signals that could be used to determine the current state of the vehicle 200 or determine the position of the vehicle 200 in respect to its environment for use in either creating a map format or determining the position of the vehicle 200 in respect to the map format.

The autonomous driving module 215 and/or other element(s) of the vehicle 200 can be configured to provide driving situational awareness. Such situational awareness can use data from the sensor system 220, off-vehicle sensors, and/or other sources of information. An example of a vehicle configured to provide driving situational awareness is described in U.S. Pat. No. 8,160,811, which is incorporated herein by reference in its entirety.

Data acquired by the sensor system 220, including driving environment data 500, can be stored in any suitable manner. For instance, the driving environment data 500 or other data can be stored in one or more of the data stores 210. The driving environment data 500 can be any data relating to the driving environment of the vehicle 200, including, for example, the location of obstacles, the current position of the vehicle, and/or any of the sensor data described above, just to name a few possibilities.

The vehicle 200 can include one or more transceivers 225. As used herein, "transceiver" is defined as a component or a group of components that transmit signals, receive signals or transmit and receive signals, whether wirelessly or through a hard-wired connection. The one or more transceivers 225 can be operatively connected to the one or more processors 205 and/or the one or more data stores 210.

The one or more transceivers 225 can enable communications between the vehicle 200 and the remote operation computing system 300 and/or other devices or systems. The one or more transceivers 225 can be any suitable transceivers used to access a network, access point, node or other device for the transmission and receipt of data. The transceiver 225 may be a wireless transceiver using any one of a number of wireless technologies. Examples of suitable transceivers include a cellular transceiver, broadband Internet transceiver, local area network (LAN) transceiver, wide area network (WAN) transceiver, wireless local area network (WLAN) transceiver, personal area network (PAN) transceiver, body area network (BAN) transceiver, WiFi transceiver, WiMax transceiver, Bluetooth transceiver, 3G transceiver, 4G transceiver, ZigBee transceiver, WirelessHART transceiver, MiWi transceiver, IEEE 802.11 transceiver, IEEE 802.15.4 transceiver, or a Near Field Communication (NFC) transceiver, just to name a few possibilities. The one or more transceivers 225 can include any wireless technology developed in the future. Again, the one or more transceivers 225 can be any suitable combination of transceivers, including any combination of the transceivers noted above.

The vehicle 200 can include an input system 230. An "input system" is defined as any device, component, system, element or arrangement or groups thereof that enable information/data to be entered into a machine. The input system 230 can receive an input from a vehicle occupant (e.g., a driver or a passenger). Any suitable input system 230 can be used, including, for example, a keypad, display, touch screen, multi-touch screen, button, joystick, mouse, trackball, microphone and/or combinations thereof.

The vehicle 200 can include an output system 235. An "output system" is defined as any device, component, system, element or arrangement or groups thereof that enable information/data to be presented to a vehicle occupant (e.g., a person, a vehicle occupant, etc.). The output system 235 can present information/data to a vehicle occupant. The output system 235 can include a display. "Display" is defined as a component or a group of components that present visual data. Alternatively or in addition, the output system 235 may include a microphone, earphone and/or speaker. "Speaker" means one or more elements, one or more devices, one or more components, one or more systems, and/or any combination thereof that produce sound in response to an audio signal input. Examples of speakers include, for example, electroacoustic transducers, sound chips, and sound cards. Some components of the vehicle 200 may serve as both a component of the input system 230 and a component of the output system 235.

The vehicle 200 can include an environment classification module 240. The environment classification module 240 can be implemented as computer readable program code that, when executed by a processor, implement the various processes described herein. The environment classification module 240 can be a component of the processor 205, or the environment classification module 240 can be executed on and/or distributed among other processing systems to which the processor 205 is operatively connected.

The environment classification module 240 can be configured to identify, classify and/or assess the driving environment of the vehicle 200. "Driving environment" means at least a portion of the external environment surrounding the vehicle. The driving environment can be located within a predetermined distance from the vehicle 200. In one or more arrangements, the predetermined distance can be established by the sensing range of one or more sensors of a sensor system 220 of the vehicle 200. The driving environment can include any information about the external environment, including, for example, the presence and/or location of one or more objects in the environment, the identity and/or nature of the objects, traffic conditions and/or weather conditions. Such information about the driving environment can be obtained from the sensor system 220 and/or from any other suitable source (e.g., websites, databases, etc.). The classification of the driving environment can be performed continuously, periodically at any suitable interval, irregularly, or even randomly.

The driving environment can be classified in various ways and/or by various methods, such as by machine learning and/or computational intelligence methods (e.g., fuzzy logic, neural networks and/or the like), just to name a few possibilities. In one or more arrangements, the driving environment can be classified based on the complexity of the driving environment. The complexity of the driving environment can be defined in any suitable manner. For example, in one or more arrangements, the classifications of the driving environment can include a low complexity environment and a high complexity environment. While arrangements will be described herein with respect to low complexity and high complexity environments, it will be understood that these classifications are provided merely as examples. Indeed, there can be additional types of classifications (e.g., one or more medium complexity environments). Further, there can be entirely different types of classifications for the driving environment.

The complexity of a driving environment can be classified based on one or more suitable factors. For instance, the driving environment can be classified as low complexity if a relatively small number of objects is detected in the driving environment, a relatively low density of objects is detected in the driving environment, the objects detected in the driving environment are detected as moving in a relatively small number of different directions, a relatively small number of different types of objects is detected in the driving environment, a relatively small amount of occlusions of individual objects in the driving environment is detected, and/or a high degree of agreement in data captured by the sensor system is attained.

Further, the driving environment can be classified as a high complexity if a relatively large number of objects is detected in the driving environment, a relatively high density of objects is detected in the driving environment, the objects detected in the driving environment are detected as moving in a relatively large number of different directions, a relatively large number of different types of objects is detected in the driving environment, a relatively large amount of occlusions of individual objects in the driving environment is detected, and/or a low degree of agreement in data captured by the sensor system of the vehicle is attained. Each of these various potential factors will be addressed in turn below.

With respect to the number of objects in the driving environment, a detected quantity objects in the driving environment can be compared to a predetermined quantity of objects. For instance, the predetermined quantity of objects can be 10 or fewer, 5 or fewer, or 3 or fewer, just to name a few possibilities. Thus, if the quantity of detected objects is at or below the predetermined quantity of objects, the driving environment can be considered to be low complexity. If the quantity of detected objects is above the predetermined quantity of objects, the driving environment can be classified as a high complexity environment or some other non-low complexity classification. As an example, if no objects (e.g., vehicles) are detected in the driving environment, then, in one or more arrangements, the driving environment can be classified as a low complexity environment.

With respect to the density of objects in the driving environment, a detected density (e.g., a quantity of objects located in a given area) can be compared to a predetermined density (e.g., a predetermined quantity of objects for a given area). If the detected density is less than or equal to the predetermined density, then the driving environment can be classified as a low complexity environment. If the detected density is greater than the predetermined density, the driving environment can be classified as a high complexity environment or some other non-low complexity classification.

Further, the complexity of the driving environment can be classified with respect to the number of different directions in which detected objects are moving. The direction of movement of detected objects in the driving environment can be detected by one or more sensors of the sensor system 220. The total number of different directions of movement of such objects can be determined. The total number of different directions of movement can be compared to a predetermined number of directions of movement. If the detected number of different directions of movement is less than or equal to the predetermined number of directions of movement, the driving environment can be classified as a low complexity environment. If the quantity of detected objects is above the predetermined quantity of objects, the driving environment can be classified as a high complexity environment or some other non-low complexity classification. The predetermined number of directions can be any suitable value, such as 5 or less, 4 or less, 3 or less, 2 or less, or 1.

The complexity of the driving environment can be classified with respect to the number of different types of objects in the driving environment. For instance, the vehicle 200 can be configured to determine the general type of one or more objects detected in the driving environment. For instance, the vehicle 200 can determine whether a detected object is a vehicle, a pedestrian, a bicyclist, a motorcyclist, just to name a few possibilities. Once the general type of the detected objects is determined, the total number of different types of objects can be determined. The total number of different types of objects can be compared to a predetermined number of different types of objects. If the detected number of different types of objects is less than or equal to the predetermined number of different types of objects, the driving environment can be classified as a low complexity environment. If the determined number of different types of objects is greater than the predetermined number of different types of objects, the driving environment can be classified as a high complexity environment or some other non-low complexity classification. The predetermined number of different types of objects can be any suitable value, such as 3 or less, 2 or less, or 1.

The complexity of the driving environment can be classified with respect to the number of occlusions of individual objects in the driving environment. Generally, as the number of occlusions decreases, the ease of interpretation and assessment of data from the sensor system 220 of the vehicle 200 increases. A detected number of occlusions can be compared to a predetermined number of occlusions. For instance, the predetermined number of occlusions can be 5 or fewer, 4 or fewer, or 3 or fewer, 2 or fewer, or 1, just to name a few possibilities. Thus, if the detected number of occlusions is less than or equal to the predetermined number of occlusions, the driving environment can be classified as a low complexity environment. If the detected number of occlusions is greater than the predetermined number of occlusions, the driving environment can be classified as a high complexity environment or some other non-low complexity classification.

The complexity of the driving environment can be classified with respect to the degree of agreement in data acquired by the sensor system 220. If data acquired by the sensor system 220 is identical or matches within a predetermined probability (e.g., about 85% or greater, about 90% or greater, about 95% or greater, etc.) or confidence level, the driving environment can be classified as being a low complexity environment. However, if data acquired by the sensor system 220 is not identical or does not match within a predetermined probability or confidence level, then the driving environment can be classified as being a high complexity environment. For example, a driving environment with heavy fog, rain, or snow may result in the above-mentioned data sensing mismatches. In such cases, the driving environment can be classified as a complex driving environment.

Of course, it will be understood that the classification of the driving environment can be made with respect to any combination of the above factors. Further, the classification of the driving environment can be made with respect to any combination of one or more of the above factors with one or more others factors not listed above. Still further, the classification of the driving environment can be made with respect to any one or more other factors not listed above. As an example, in one or more arrangements, the number of detected objects and the number of directions in which such detected objects are moving can be used together to classify the driving environment. For instance, if there are 15 detected objects and all of the detected objects are determined to be moving in substantially the same direction, then the environment may be classified as a low complexity environment. In contrast, if there are 15 detected objects and the detected objects are moving in a total of 7 different directions, then the driving environment may be classified as a high complexity environment.

The vehicle 200 can include a communication channel module 245. The communication channel module 245 can be implemented as computer readable program code that, when executed by a processor, implement the various processes described herein. The communication channel module 245 can be a component of the processor 205, or the communication channel module 245 can be executed on and/or distributed among other processing systems to which the processor 205 is operatively connected. The communication channel module 245 can be configured to analyze, assess, and/or determine the availability of a communication channel between the vehicle 200 and the remote operation computing system 300 and/or one or more characteristics about such a communication channel.

The communication channel module 245 can collect the communication channel availability data from one or more communication channel availability data sources. The communication channel availability data can be collected in any suitable manner by communication channel module 245. The collection of the communication channel availability data can be performed on any suitable basis, such as continuous, periodic, irregular or even randomly. "Communication channel availability data source" means any source from which data relating to the availability of one or more communication channels between the vehicle and a remote operation computing system can be obtained. As used herein, "availability of a communication channel" means information about the ability to use a communication channel and/or one or more characteristics about such a communication channel. Such information can include past, present, future and/or predictive information. Examples of such information include availability, type, strength, speed, bandwidth, accessibility, losses, and/or other characteristics of the communication channel.

The communication channel availability data sources can include current or real time data. The communication channel availability data sources can include historical data. The communication channel availability data sources can include predicted data. Data can be obtained from the communication channel availability data sources in any suitable manner, including, for example, by, directly or indirectly, sensing, measuring, detecting, extrapolating, interpolating, inferring, accessing and/or recording. Data obtained from the one or more communication channel availability data sources can be stored in the data store 210 or in any suitable location.

The communication channel availability data sources can include one or more direct detection/measurement data sources, one or more websites, one or more data stores, one or more predictive data systems, and/or one or more other suitable data source. The vehicle 200 can include one or more direct detection and/or measurement device(s), component(s), and/or system(s) configured to directly detect, determine, assess, measure and/or sense any suitable information or data relating to the availability of a communication channel. For instance, the direct detection and/or measurement device(s), component(s), and/or system(s) can determine the number of WiFi hotspots available in a given location. As a further example, the direct detection and/or measurement device(s), component(s), and/or system(s) can detect the bandwidth, signal strength, packet loss, latency, and/or other characteristic of a particular communication channel in a particular location. The direct detection and/or measurement device(s), component(s), and/or system(s) can include one or more suitable sensors to collect such data. The sensors can be a part of the sensor system 220.

In one or more arrangements, an example of indirect detection of the availability of a communication channel can be at least partially based on the time of day. For example, during the day, it can be determined that the bandwidth of the communication channel is lower because of greater usage. In contrast, during the night, it can be determined that the bandwidth of the communication channel is greater because of less usage. As another example, indirect detection of the availability of a communication channel can be at least partially based on solar activity. Solar activity refers to phenomena occurring within the magnetically heated outer atmospheres in the Sun. Examples of solar activity include solar wind acceleration, flux emergence, light and energy particles released from the Sun (e.g., solar flares, coronal mass ejection or solar eruptions), coronal heating, and sunspots. Increased solar activity can result in disruptions to communication channels. Thus, in times of increased solar activity or when the effects of such increased solar activity are predicted to reach or be near the Earth, it can be determined that the bandwidth of the communication channel is lower. In contrast, during times of normal or reduced solar activity, it can be determined that the bandwidth of the communication channel is normal or higher. As still another example, indirect detection of the availability of a communication channel can be at least partially based on the current location of the autonomous vehicle. For instance, in some locations, it is known or can be predicted that the bandwidth of the communication channel is lower or even unavailable, such as when the vehicle is traveling through a tunnel, in a known dead spot, or in a remote location.

The vehicle 200 can include a vehicle sensor selection module 250. The vehicle sensor selection module 250 can be implemented as computer readable program code that, when executed by a processor, implement the various processes described herein. The vehicle sensor selection module 250 can be a component of the processor 205, or the vehicle sensor selection module 250 can be executed on and/or distributed among other processing systems to which the processor 205 is operatively connected.

The vehicle sensor selection module 250 can be configured to select a subset of the plurality of different sensor types based on the complexity of the current driving environment and/or the availability of a communication channel between the autonomous vehicle and the remote operation computing system. A "subset of the plurality of different sensor types" means less than all of the available types of sensors. For instance, if the sensor system 220 includes four different types of sensors, a subset of the plurality of different sensor types could be three of the different sensor types, two of the different sensor types, or one of the different sensor types. The selection of a subset of the plurality of different sensor types can be made with respect to which sensor data (e.g., driving environment data) will be the most efficient to transmit to the remote operation computing system 300. The vehicle sensor selection module 250 can also determine a sample rate based on at least one of the determined driving environment complexity and the communication channel availability.

As an example, the driving environment can include a road with a 45 MPH legal speed limit. It may be nighttime, and there can be relatively few vehicles on the road. In such case, the vehicle 200 can determine that a representation of a driving environment might be more suitable based on data from the LIDAR sensors 222 than data from the cameras 224 and/or RADAR sensors 221. The vehicle 200 can also determine a sampling rate of one sample per second to send to the remote operation computing system 300.

The vehicle 200 can include one or more vehicle systems 260. Various examples of the one or more vehicle systems 260 are shown in FIG. 1. However, the vehicle 200 can include more, fewer or different systems. It should be appreciated that although particular vehicle systems are separately defined, each or any of the systems or portions thereof may be otherwise combined or segregated via hardware and/or software within the vehicle 200.

The vehicle 200 can include a propulsion system 265. The propulsion system 265 can include one or more mechanisms, devices, elements, components, systems, and/or combinations thereof, now known or later developed, configured to provide powered motion for the vehicle 200. The propulsion system 265 can include an engine and an energy source.

The engine can be any suitable type of engine or motor, now known or later developed. For instance, the engine can be an internal combustion engine, an electric motor, a steam engine, and/or a Stirling engine, just to name a few possibilities. In some embodiments, the propulsion system could include a plurality of engine types. For instance, a gas-electric hybrid vehicle can include a gasoline engine and an electric motor.

The energy source can be any suitable source of energy that can be used to at least partially power the engine. The engine can be configured to convert the energy source into mechanical energy. Examples of energy sources include gasoline, diesel, propane, hydrogen, other compressed gas-based fuels, ethanol, solar panels, batteries, and/or other sources of electrical power. Alternatively or in addition, the energy source can include fuel tanks, batteries, capacitors, and/or flywheels. In some embodiments, the energy source can be used to provide energy for other systems of the vehicle 200.

The vehicle 200 can include wheels, tires and/or tracks. Any suitable type of wheels, tires and/or tracks can be used. In one or more arrangements, the wheels, tires and/or tracks of the vehicle 200 can be configured to rotate differentially with respect to other wheels, tires and/or tracks of the vehicle 200. The wheels, tires and/or tracks can be made of any suitable material.

The vehicle 200 can include a braking system 270. The braking system 270 can include one or more mechanisms, devices, elements, components, systems, and/or combinations thereof, now known or later developed, configured to decelerate the vehicle 200. As an example, the braking system 270 can use friction to slow the wheels/tires. The braking system 270 can convert the kinetic energy of the wheels/tires to electric current.

Further, the vehicle 200 can include a steering system 275. The steering system 275 can include one or more mechanisms, devices, elements, components, systems, and/or combinations thereof, now known or later developed, configured to adjust the heading of the vehicle 200.

The vehicle 200 can include a throttle system 280. The throttle system 280 can include one or more mechanisms, devices, elements, components, systems, and/or combinations thereof, now known or later developed, configured to control the operating speed of an engine/motor of the vehicle 200 and, in turn, the speed of the vehicle 200.

The vehicle 200 can include a transmission system 285. The transmission system 285 can include one or more mechanisms, devices, elements, components, systems, and/or combinations thereof, now known or later developed, configured to transmit mechanical power from the engine/motor of the vehicle 200 to the wheels/tires. For instance, the transmission system 285 can include a gearbox, clutch, differential, drive shafts, and/or other elements. In arrangements where the transmission system 285 includes drive shafts, the drive shafts can include one or more axles that are configured to be coupled to the wheels/tires.

The vehicle 200 can include a signaling system 290. The signaling system 290 can include one or more mechanisms, devices, elements, components, systems, and/or combinations thereof, now known or later developed, configured to provide illumination for the driver of the vehicle 200 and/or to provide information with respect to one or more aspects of the vehicle 200. For instance, the signaling system 290 can provide information regarding the vehicle's presence, position, size, direction of travel, and/or the driver's intentions regarding direction and speed of travel. For instance, the signaling system 290 can include headlights, taillights, brake lights, hazard lights and turn signal lights.

The vehicle 200 can include a navigation system 295. The navigation system 295 can include one or more mechanisms, devices, elements, components, systems, applications and/or combinations thereof, now known or later developed, configured to determine the geographic location of the vehicle 200 and/or to determine a travel route for the vehicle 200.

The navigation system 295 can include one or more mapping applications to determine a travel route for the vehicle 200. For instance, a driver or passenger may input an origin and a destination. The mapping application can determine one or more suitable travel routes between the origin and the destination. A travel route may be selected based on one or more parameters (e.g., shortest travel distance, shortest amount of travel time, etc.). In some arrangements, the navigation system 295 can be configured to update the travel route dynamically while the vehicle 200 is in operation.

The navigation system 295 can include a global positioning system, a local positioning system or a geolocation system. The navigation system 295 can be implemented with any one of a number of satellite positioning systems, such as the United States Global Positioning System (GPS), the Russian Glonass system, the European Galileo system, the Chinese Beidou system, or any system that uses satellites from a combination of satellite systems, or any satellite system developed in the future, including the planned Chinese COMPASS system and the Indian Regional Navigational Satellite System. Further, the navigation system 295 can use Transmission Control Protocol (TCP) and/or a Geographic information system (GIS) and location services.

The navigation system 295 may include a transceiver configured to estimate a position of the vehicle 200 with respect to the Earth. For example, navigation system 295 can include a GPS transceiver to determine the vehicle's latitude, longitude and/or altitude. The navigation system 295 can use other systems (e.g., laser-based localization systems, inertial-aided GPS, and/or camera-based localization) to determine the location of the vehicle 200.

Alternatively or in addition, the navigation system 295 can be based on access point geolocation services, such as using the W3C Geolocation Application Programming Interface (API). With such a system, the location of the vehicle 200 can be determined through the consulting of location information servers, including, for example, Internet protocol (IP) address, Wi-Fi and Bluetooth Media Access Control (MAC) address, radio-frequency identification (RFID), Wi-Fi connection location, or device GPS and Global System for Mobile Communications (GSM)/code division multiple access (CDMA) cell IDs. Thus, it will be understood that the specific manner in which the geographic position of the vehicle 200 is determined will depend on the manner of operation of the particular location tracking system used.

The processor 205 and/or the autonomous driving module 215 can be operatively connected to communicate with the various vehicle systems 260 and/or individual components thereof. For example, returning to FIG. 1, the processor 205 and/or the autonomous driving module 215 can be in communication to send and/or receive information from the various vehicle systems 260 to control the movement, speed, maneuvering, heading, direction, etc. of vehicle 200. The processor 205 and/or the autonomous driving module 215 may control some or all of these vehicle systems 260 and, thus, may be partially or fully autonomous.

The processor 205 and/or the autonomous driving module 215 may be operable to control the navigation and/or maneuvering of the vehicle 200 by controlling one or more of the vehicle systems 260 and/or components thereof. For instance, when operating in an autonomous mode, the processor 205 and/or the autonomous driving module 215 can control the direction and/or speed of the vehicle 200. The processor 205 and/or the autonomous driving module 215 can cause the vehicle 200 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 200 can include one or more actuators 255. The actuators 255 can be any element or combination of elements operable to modify, adjust and/or alter one or more of the vehicle systems 260 or components thereof to responsive to receiving signals or other inputs from the processor 205 and/or the autonomous driving module 215. Any suitable actuator can be used. For instance, the one or more actuators 255 can include motors, pneumatic actuators, hydraulic pistons, relays, solenoids, and/or piezoelectric actuators, just to name a few possibilities.

Figure 3:
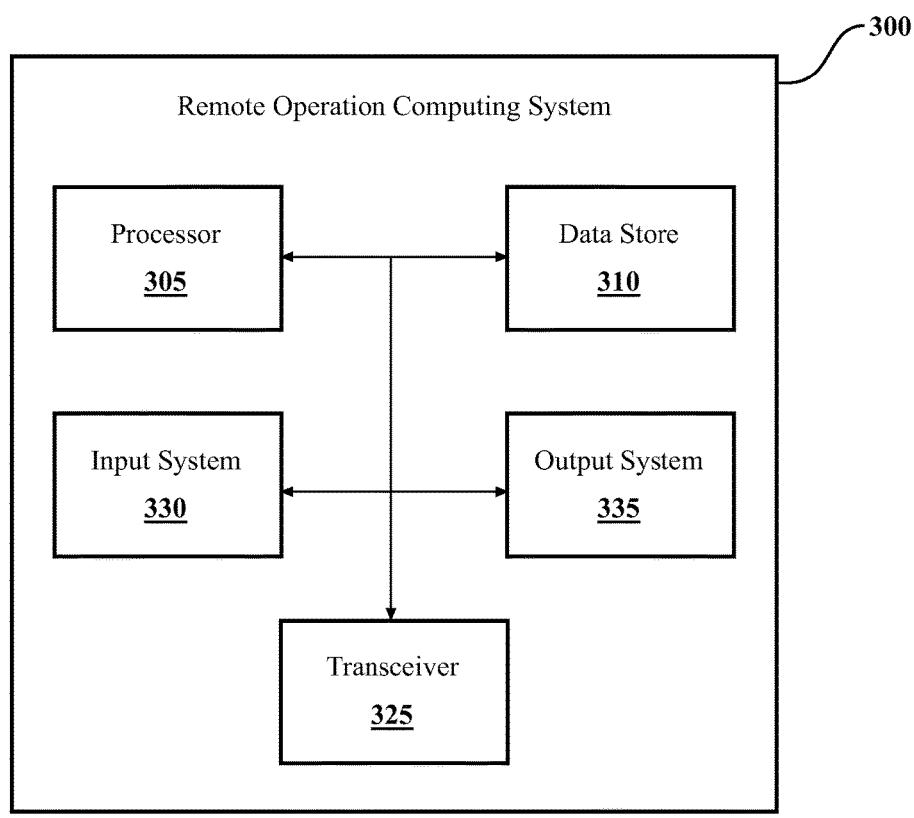
FIG. 3 is an example of a remote operation computing system.

Referring to FIG. 3, an example of the remote operation computing system 300 is shown. Some of the possible elements of the remote operation computing system 300 are shown in FIG. 3 and will now be described. It will be understood that it is not necessary for the remote operation computing system 300 to have all of the elements shown in FIG. 3 or described herein. The remote operation computing system 300 can have any combination of the various elements shown in FIG. 3. Further, the remote operation computing system 300 can have additional elements to those shown in FIG. 3. In some arrangements, the remote operation computing system 300 may not include one or more of the elements shown in FIG. 3. The various elements of the remote operation computing system 300 can be operatively connected to each other in any suitable manner. Further, the elements shown may be physically separated by large distances.

The remote operation computing system 300 can include one or more processors 305, one or more data stores 310, an input system 330, an output system 335, and/or one or more transceivers 325. The above description of the one or more processors 205, the one or more data stores 210, the one or more data stores 210, the input system 230, the output system 235, and/or the one or more transceivers 225 presented in connection with the vehicle 200 applies equally to the one or more processors 305, the one or more data stores 310, the input system 330, the output system 335, and/or the one or more transceivers 325, respectively, of the remote operation computing system 300.

According to arrangements described herein, the vehicle 200 can send a remote operation request 400 to the remote operation computing system 300. The remote operation request 400 can be a request to take control of the autonomous vehicle 200 and/or to monitor the autonomous vehicle 200. A remote operator can use the remote operation computing system 300 to monitor the vehicle 200 and/or to send commands 600 to the vehicle 200.

The vehicle 200 can be configured to send driving environment data 500 and/or other information to the remote operation computing system 300. Examples of driving environment data 500 include the location of objects (e.g., current and/or recent location), the location of the vehicle 200, a short-term prediction of dynamic objects, and/or a sensor representation of the current driving environment. Such a sensor representation can be based on data from one or more different types of sensors of the sensor system 220 that are most suitable for the current driving environment, as described herein. The driving environment data 500 can be updated at a rate suitable for both the communication channel availability and/or the amount of risk associated with the current driving environment. Such information vehicle can provide to the operator various information necessary to remotely operate the vehicle 200.

The driving environment data 500 can be presented to the remote operator, who can view such data. For example, the driving environment data 500 can be presented visually to a remote operator. The remote operator can see at least a portion of the driving environment of the vehicle 200, such as from data acquired by the one or more cameras 224. Alternatively or in addition, the remote operator can see data regarding the speed of the surrounding vehicles using the RADAR sensors 221 or LIDAR sensors 222. In one example implementation, the sensor system 220 and/or one or more sensors and/or cameras thereof can be remotely controlled by the remote operator, for example, to cause the sensors and/or cameras to rotate, pan, or zoom in or out. The remote operator can also have access to the location data captured by the sensor system 220. Accordingly, to assist the remote operator, a map of the environment can be displayed to the remote operator. An icon or other graphical indicator representing the vehicle 200 can be displayed at the correct location on the map, along with icons or graphical indicators representing other vehicles or other features of or objects in the driving environment.

While the remote operator has control of the vehicle 200, the remote operator can directly operate the vehicle 200 and/or one or more of the vehicle systems 260 in real time, having a real-time awareness of the driving environment using the information captured by the sensor system 220. The remote operator can issue commands 600 to the vehicle 200 to execute various driving maneuvers (e.g., move over one lane, slow down, etc.). The driving maneuvers can be predefined driving maneuvers. The vehicle 200 can automatically implement the driving maneuvers. As another example, the remote operator can manually modify the travel route that the autonomous driving module 215 is using to guide the vehicle 200. For example, the remote operator can be presented with several options of alternate routes available (as one example user interface for the remote operator, trajectories of alternate routes can be superimposed on a map of the driving environment). Upon the remote operator's selection of a new route, the autonomous driving module 215 can then continue to operate the vehicle autonomously using the new route.

In one example implementation, the remote operator can be operating the vehicle 200 from inside a simulator machine. The simulator machine can be configured like a vehicle. The simulator machine can include a monitor in place of a windshield that, based on sensor data received from the vehicle 200, mimics the view a driver has from inside the vehicle 200 itself.

In another example implementation, information from other vehicles in the vicinity can potentially augment the data captured by the vehicle 200 and assist the remote operator in guiding the vehicle 200. For example, image information captured by cameras disposed on nearby vehicles can provide a different view of the scene that can assist the remote operator. As another example, data received from another vehicle ahead of the vehicle 200 may be able to reveal additional environmental information regarding the unexpected driving environment (such as obstacles not yet encountered by the vehicle 200). In one example implementation, each vehicle on the road (including the vehicle 200) can periodically or continually update a remote server (such as the remote operation computing system 300 used by the remote operator) with its location data. Then, when a remote operator is remotely operating a vehicle in that area, the remote operation computing system 300 can request sensor data from these vehicles. Alternatively, the vehicle 200 itself can communicate with other nearby vehicles using any suitable communication network (e.g., a local, ad hoc wireless connection) to receive the relevant sensor data from such other vehicles. The vehicle 200 can forward such information to the remote operation computing system 300 to be used by the remote operator.

In one example implementation, before the remote operator is contacted, the driver can be prompted and/or asked, for example, using the output system 235, to confirm or approve granting control to the remote operator. The driver can respond using the input system 230. If the driver responds affirmatively and elects to initiate the remote operational mode, then the remote operator can be contacted, the relevant data captured by the sensor system 220 can be sent to the remote operator, as described herein. Control of the vehicle 200 can pass to the remote operator. If, on the other hand, the driver does not elect to contact the remote operator, then the vehicle 200 can switch to the manual operational mode and the driver can take control of the vehicle 200 and vehicle systems 260. Alternatively, the vehicle 200 can be configured so that the driver is given the opportunity to affirmatively elect to retain control of the vehicle 200 and enter it into the manual operational mode. If the driver does not so elect within a predefined period of time, then the remote operator can be contacted and control of the vehicle 200 can pass automatically to the remote operator.

In another example, if the vehicle 200 encounters a predetermined event, control of the vehicle 200 can pass to the remote operator seamlessly and automatically. The passing of control of the vehicle 200 can occur without requiring an affirmative selection by the driver. In such an implementation, the driver can be alerted to the fact that the vehicle 200 is being operated remotely by a remote operator. In addition, an audio and/or visual-based communication can be established between the remote operator and the driver so that the remote operator is able to ask the driver questions regarding the current driving environment or otherwise advise the driver regarding the remote operation of the vehicle 200. Furthermore, in a particularly challenging unexpected driving environment, it is possible that the remote operator may not feel comfortable operating the vehicle 200 remotely. In such a case, the remote operator can advise the driver that control is being ceded to the driver and that the vehicle 200 will be entering the manual operational mode or a standby mode. In another example implementation, control can pass to the remote operator automatically, without requiring an affirmative selection by the driver, and without notifying the driver. In this way, the fact that the vehicle 200 is being remotely operated instead of autonomously operated can be invisible to the driver.

Figure 4:
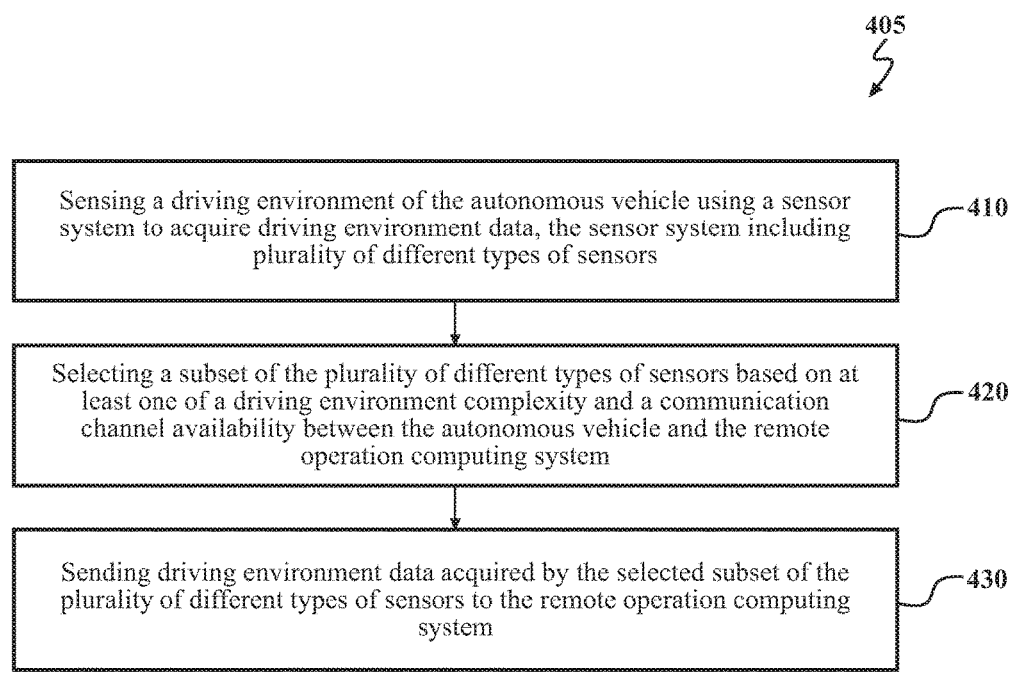
FIG. 4 is an example of a method of transferring data between an autonomous vehicle and a remote operation computing system.

Now that the various potential systems, devices, elements and/or components of the vehicle 200 have been described, various methods of transferring vehicle sensor data between an autonomous vehicle and a remote operation computing system will now be described. Referring now to FIG. 4, an example of a method of transferring vehicle sensor data between an autonomous vehicle and a remote operation computing system is shown. Various possible steps of method 405 will now be described. The method 405 illustrated in FIG. 4 may be applicable to the embodiments described above in relation to FIGS. 1-3, but it is understood that the method 405 can be carried out with other suitable systems and arrangements. Moreover, the method 405 may include other steps that are not shown here, and in fact, the method 405 is not limited to including every step shown in FIG. 4. The steps that are illustrated here as part of the method 405 are not limited to this particular chronological order. Indeed, some of the steps may be performed in a different order than what is shown and/or at least some of the steps shown can occur simultaneously.

At block 410, a driving environment of the autonomous vehicle can be sensed using the sensor system 220 to acquire driving environment data. The sensor system 220 includes a plurality of different types of sensors (e.g., LIDAR sensors 222, RADAR sensors 221, ultrasound sensors 223, cameras 224, etc.). The driving environment can be sensed by each of the different types of sensors. The sensing of the driving environment can be performed continuously or periodically at any suitable interval. The method 405 can continue to block 420.

At block 420, a subset of the plurality of different types of sensors can be selected based on the driving environment complexity and/or the communication channel availability between the vehicle 200 and the remote operation computing system 300. Such a selection can be made by the vehicle sensor selection module 250. The driving environment complexity can be determined by the environment classification module 240, and the communication channel availability can be determined by the communication channel module 245. The method can continue to block 430.

At block 430, driving environment data acquired by the selected subset of the plurality of different types of sensors can be sent to the remote operation computing system 300.

The driving environment data can be processed by the remote operation computing system 300 and/or a remote operator to remotely supervise and/or control the vehicle 200.

The method 405 can end. Alternatively, the method 405 can return to block 410. As a further alternative, the method 405 can include additional and/or alternative blocks (not shown). For instance, in one or more arrangements, the method 405 can include determining a sample rate based on the driving environment complexity and/or the communication channel availability can be determined. Such a determination can be made by the vehicle sensor selection module 250. In such case, sending driving environment data acquired by the selected subset of the plurality of different types of sensors to the remote operation computing system in block 430 include sending driving environment data acquired by the selected subset of the plurality of different types of sensors to the remote operation computing system 300 at the determined sample rate.

Further, it will be appreciated that, as the vehicle 200 proceeds through the driving environment, there may be changes in the driving environment complexity and/or the communication channel availability. Accordingly, the method 405 can include determining whether there is a change in at least one of the driving environment complexity and/or the communication channel availability. Responsive to determining that there is a change in at least one of the driving environment complexity and/or the communication channel availability, the sample rate can be adjusted and/or a different subset of the plurality of different types of sensors can be selected.

A non-limiting example of the arrangements herein will now be described. In this example, the vehicle 200 can be traveling on an empty road in the middle of the night. The driving environment can be classified as being low complexity. Safe driving in such an environment can be relatively easy. The vehicle 200 (or the remote operator) can readily follow the road since there are no dynamic obstacles around. The remote operator can safely control the vehicle safely even if the operator is provided with a sensed representation of the environment at a relatively infrequent sample rate (e.g., once a second) or as otherwise permitted by the communication channel availability. If an intersection or a roundabout is empty, the remote operator can adequately control the vehicle 200 remotely with infrequent sample rates.

In contrast, when the vehicle 200 is driving on a busy street or driving on a highway with cars nearby, the driving environment can be classified as being high complexity. A faster data transfer rate between the vehicle and the remote operator is needed to support safe remote operation of the vehicle 200. In such case, sufficient bandwidth and a reliable connection for the communication channel are needed to provide for faster data transfer. Also, a more frequent sample rate is needed due to the highly dynamic nature of the driving environment.

In some situations, the remote operator can compensate for the vehicle's deficiencies (e.g., perception system errors of the vehicle 200). For example, when the vehicle 200 is merging into a roundabout, high-resolution pictures of the driving environment may be sent with infrequent sample rate (e.g., about 1 second between frames) due to a current communication channel bandwidth limitation. Such pictures can still be assessed more quickly by a human than by the vehicle. The remote operator can visually confirm whether the roundabout is empty, even if the vehicle 200 has not completed its on-board analysis but has already started implementing a safety maneuver (e.g., slowing down) for safety reasons because it cannot perceive the driving environment as well as a human being is able to. The remote operator can then send a command 600 to the vehicle 200 to override or discontinue the safety maneuver.

In some situations the sensor system 220 of the vehicle 200 may be affected negatively by some objects in the environment. For example, the RADAR sensors 221 might provide confusing measurements of the speed and distance of some objects (e.g., reflections from guard rails or small metallic objects lying on the ground). The remote operator can be provided with long-latency (e.g., infrequent sample rate) imagery of the driving environment in order to clarify the true situation in the environment so that the vehicle 200 might still be able to drive without reducing speed or other changes in spite of confusing or even malfunctioning RADAR sensors 221.

In other situations, bad weather or the sun's position with respect to the vehicle 200 may temporarily "blind" or otherwise interfere with the LIDAR sensors 222 or the cameras 224. As an example, it is difficult to see the traffic lights against the sun. It may be difficult for even a remote operator with sharp eyesight to see the traffic lights in such a case. However, a remote operator would still be able to maneuver the vehicle 200 by observing the behavior of cars in the surrounding environment. For instance, the remote operator can conclude whether the traffic light is red or green based on whether the vehicle located in front of the vehicle 200 are moving forward or whether they are stopped.

It will be appreciated that arrangements described herein can provide numerous benefits, including one or more of the benefits mentioned herein. For example, arrangements described herein can improve the performance of an autonomous vehicle. Arrangements described herein can provide for improved capabilities of highly automated vehicles by soliciting help of a human operator from a remote location while maintaining the high level of safety and comfort of driving. Arrangements described herein can help a remote operator to make informed and less risky decisions consistent with the communication channel availability between the vehicle and the remote operation computing system. Arrangements described herein can efficiently transfer driving environment data to the remote operator. Arrangements described herein can streamline the information presented to the remote operator. For instance, the remote operator does not need to see a map of the driving environment to make safe and effective driving decisions due to superior capabilities of humans in scene understanding. Further, arrangements described herein can increase the overall confidence level of vehicle occupants in the autonomous vehicle.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied or embedded, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A method of transferring data from an autonomous vehicle to a remote operation computing system while the autonomous vehicle is operating in a remote operational mode, the method comprising: sensing a driving environment of the autonomous vehicle using a sensor system to acquire driving environment data, the sensor system including plurality of different types of sensors; selecting a subset of the plurality of different types of sensors based on at least one of a driving environment complexity and a communication channel availability between the autonomous vehicle and the remote operation computing system, the subset of the plurality of different types of sensors including less than all of the different types of sensors; determining a sample rate based on at least one of the driving environment complexity and the communication channel availability between the autonomous vehicle and the remote operation computing system; and sending driving environment data acquired by the selected subset of the plurality of different types of sensors to the remote operation computing system at the determined sample rate.

2. The method of claim 1, further including: determining whether there is a change in at least one of the driving environment complexity and the communication channel availability between the autonomous vehicle and the remote operation computing system; and responsive to determining that there is a change in at least one of the driving environment complexity and the communication channel availability between the autonomous vehicle and the remote operation computing system, adjusting at least one of: the sample rate or the subset of the plurality of different types of sensors.

3. The method of claim 1, further including: determining the driving environment complexity; and determining the communication channel availability between the autonomous vehicle and the remote operation computing system.

4. The method of claim 1, further including: receiving a command from the remote operation computing system, the command including one or more driving maneuvers; and causing the autonomous vehicle to implement the one or more driving maneuvers.

5. The method of claim 3, wherein determining the communication channel availability between the autonomous vehicle and a remote operation computing system includes determining a bandwidth of the communication channel between the autonomous vehicle and a remote operation computing system.

6. The method of claim 5, wherein determining the bandwidth of a communication channel between the autonomous vehicle and the remote operation computing system is at least partially based on one of a current time of day, solar activity, or a current location of the autonomous vehicle.

7. The method of claim 1, further including: determining whether there is a change in at least one of the driving environment complexity and the communication channel availability between the autonomous vehicle and the remote operation computing system; and responsive to determining that there is a change in at least one of the driving environment complexity and the communication channel availability between the autonomous vehicle and the remote operation computing system, selecting a subset of the plurality of different types of sensors based on at least one of the changed driving environment complexity and the changed communication channel availability.

8. A system for transferring data from an autonomous vehicle to a remote operation computing system while the autonomous vehicle is operating in a remote operational mode, the system comprising: a sensor system, the sensor system including a plurality of different types of sensors, the sensor system being configured to sense a driving environment of the autonomous vehicle to acquire driving environment data; and a processor operatively connected to the sensor system, the processor being programmed to initiate executable operations comprising: selecting a subset of the plurality of different types of sensors based on at least one of a driving environment complexity and a communication channel availability between the autonomous vehicle and the remote operation computing system, the subset of the plurality of different types of sensors including less than all of the different types of sensors; determining a sample rate based on at least one of the driving environment complexity and the communication channel availability between the autonomous vehicle and the remote operation computing system; and sending driving environment data acquired by the selected subset of the plurality of different types of sensors to the remote operation computing system at the determined sample rate.

9. The system of claim 8, wherein the executable operations further include: determining whether there is a change in at least one of the driving environment complexity and the communication channel availability between the autonomous vehicle and the remote operation computing system; and responsive to determining that there is a change in at least one of the driving environment complexity and the communication channel availability between the autonomous vehicle and the remote operation computing system, adjusting at least one of: the sample rate or the subset of the plurality of different types of sensors.

10. The system of claim 8, wherein the executable operations further include: determining the driving environment complexity; and determining the communication channel availability between the autonomous vehicle and the remote operation computing system.

11. The system of claim 8, wherein the executable operations further include: receiving a command from the remote operation computing system, the command including one or more driving maneuvers; and causing the autonomous vehicle to implement the one or more driving maneuvers.

12. The system of claim 10, wherein determining the communication channel availability between the autonomous vehicle and a remote operation computing system includes determining a bandwidth of the communication channel between the autonomous vehicle and a remote operation computing system.

13. he system of claim 12, wherein determining the bandwidth of a communication channel between the autonomous vehicle and the remote operation computing system is at least partially based on one of a current time of day, solar activity, or a current location of the autonomous vehicle.

14. The system of claim 8, wherein the executable operations further include: determining whether there is a change in at least one of the driving environment complexity and the communication channel availability between the autonomous vehicle and the remote operation computing system; and responsive to determining that there is a change in at least one of the driving environment complexity and the communication channel availability between the autonomous vehicle and the remote operation computing system, selecting a subset of the plurality of different types of sensors based on at least one of the changed driving environment complexity and the changed communication channel availability.

15. The system of claim 8, wherein the plurality of different types of sensors are configured to sense substantially 360 degrees of the driving environment of the autonomous vehicle.

16. A computer program product for transferring data from an autonomous vehicle to a remote operation computing system while the autonomous vehicle is operating in a remote operational mode, the computer program product comprising a non-transitory computer readable storage medium having program code embodied therewith, the program code executable by a processor to perform a method comprising: sensing a driving environment of the autonomous vehicle using a sensor system to acquire driving environment data, the sensor system including plurality of different types of sensors; selecting a subset of the plurality of different types of sensors based on at least one of a driving environment complexity and a communication channel availability between the autonomous vehicle and the remote operation computing system, the subset of the plurality of different types of sensors including less than all of the different types of sensors; determining a sample rate based on at least one of the driving environment complexity and the communication channel availability between the autonomous vehicle and the remote operation computing system; and sending driving environment data acquired by the selected subset of the plurality of different types of sensors to the remote operation computing system at the determined sample rate.

17. The computer program product of claim 16, wherein the method further includes: determining whether there is a change in at least one of the driving environment complexity and the communication channel availability between the autonomous vehicle and the remote operation computing system; and responsive to determining that there is a change in at least one of the driving environment complexity and the communication channel availability between the autonomous vehicle and the remote operation computing system, adjusting at least one of: the sample rate or the subset of the plurality of different types of sensors.

* * * * *

UNITED STATES PATENT AND TRADEMARK OFFICE
CERTIFICATE OF CORRECTION

PATENT NO.        : 9,690,290 B2
APPLICATION NO.   : 14/731254
DATED             : June 27, 2017
INVENTOR(S)       : Danil V. Prokhorov Page 1 of 1

It is certified that error appears in the above-identified patent and that said Letters Patent is hereby corrected as shown below:

In the Claims

In Claim 13, Column 26, Line 4: delete "he" and insert --The--.

Signed and Sealed this
First Day of August, 2017

Joseph Matal
*Performing the Functions and Duties of the*
*Under Secretary of Commerce for Intellectual Property and*
*Director of the United States Patent and Trademark Office*